United States Patent
Hebner et al.

(10) Patent No.: US 10,120,427 B1
(45) Date of Patent: Nov. 6, 2018

(54) MULTI-CHIP REFERENCE COUNTING POWER MANAGEMENT

(71) Applicant: Square, Inc., San Francisco, CA (US)

(72) Inventors: Nicholas Hebner, San Francisco, CA (US); David Terra, San Francisco, CA (US); Rodion Steshenko, Union City, CA (US)

(73) Assignee: Square, Inc., San Francisco, CA (US)

(*) Notice: Subject to any disclaimer, the term of this patent is extended or adjusted under 35 U.S.C. 154(b) by 227 days.

(21) Appl. No.: 15/086,002

(22) Filed: Mar. 30, 2016

(51) Int. Cl.
| | |
|---|---|
| *G06F 1/32* | (2006.01) |
| *G06F 1/26* | (2006.01) |
| *G06K 7/08* | (2006.01) |
| *G06K 7/01* | (2006.01) |
| *G06K 7/10* | (2006.01) |
| *G06Q 20/32* | (2012.01) |

(52) U.S. Cl.
CPC .......... *G06F 1/26* (2013.01); *G06K 7/01* (2013.01); *G06K 7/084* (2013.01); *G06K 7/10128* (2013.01); *G06Q 20/327* (2013.01)

(58) Field of Classification Search
CPC .................................................... G06F 1/3228
See application file for complete search history.

(56) References Cited

U.S. PATENT DOCUMENTS

| | | | |
|---|---|---|---|
| 9,128,703 B1* | 9/2015 | Lachwani | G06F 1/3203 |
| 2009/0282261 A1* | 11/2009 | Khan | G06F 21/72 |
| | | | 713/189 |
| 2017/0109743 A1* | 4/2017 | Zarakas | G06Q 20/3829 |

* cited by examiner

*Primary Examiner* — Albert Wang
(74) *Attorney, Agent, or Firm* — Maynard, Cooper & Gale, PC; Brian T. Sattizahn, Esq.

(57) ABSTRACT

A payment reader includes a power management system to control the power mode of the payment reader. The power management system can transition the payment reader between a sleep mode, a low power mode and a full power mode. The power management system can use a low power mode reference counter to determine when to transition from the full power mode to the low power mode and a sleep mode reference counter to determine when to transition from the low power mode to the sleep mode. When the low power mode reference counter reaches zero, the power management system deactivates a payment processing subsystem to transition to the low power mode. Similarly, when the sleep mode reference counter reaches zero, the power management system deactivates a payment reader system to transition to the sleep mode.

27 Claims, 9 Drawing Sheets

MULTI-CHIP REFERENCE COUNTING POWER MANAGEMENT

BACKGROUND

Electronic transaction processing systems may utilize a payment device and a payment terminal. The payment device provides payment information to the payment terminal. The payment terminal reads payment information such as a credit card number from the payment device and transmits the payment information along with information relating to the transaction to a remote transaction server. The remote transaction server determines whether the transaction is approved and provides a response to the payment terminal. To reduce the risk of fraud, many electronic transaction processing systems now require the payment information to be encrypted. The payment information can be encrypted by the payment device or the payment terminal may encrypt the payment information (along with other transaction information) for security purposes.

The processing of encrypted payment information may be performed by a dedicated cryptographic processor in the payment terminal. While the use of the cryptographic processor can improve operation of the payment terminal by relieving the general processor of the payment terminal from having to process encrypted payment information and may protect sensitive information, the cryptographic processor may use more power than the general processor. In a situation where the payment terminal has a limited power supply, such as when a battery is used, the continuous powering of the cryptographic processor can shorten the operational life of the payment terminal, i.e., the time the payment terminal can be used before recharging of the battery is required, which, in turn, shortens the amount of time that the payment terminal can process payment transactions. If the payment terminal is unable to process payment transactions, the operator of the payment terminal may lose sales opportunities and/or have to find alternative payment systems, neither of which is beneficial to the operator.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A payment reader can have a power management system to control the amount of power used by the payment reader. The power management system can control the amount of power used by the payment reader by controlling the power mode or state of the payment reader. The power management system can operate the payment reader in some modes that use more power and in other modes that use less power. The power management system can operate the payment reader in an off mode or a sleep mode to conserve power in the payment reader since the payment reader uses little to no power in the off mode and the sleep mode. In contrast, when the power management system operates the payment reader in a low power mode, the payment reader may use more power than when in the off mode or the sleep mode, and when operated in a full power mode, the payment reader may use significantly more power than the off mode, sleep mode, or low power mode.

In the low power mode, the payment reader is operating a payment reader system incorporating one or more processors and associated subsystems to control the operation of the payment reader. When the power management system transitions the payment reader from the low power mode to the full power mode, the payment reader continues to operate the payment reader system, but also initiates the operation of a payment processing subsystem incorporating one or more cryptographic processors and associated subsystems. In the sleep mode, the payment reader is not operating the payment reader system or the payment processing subsystem. The power management system can transition the payment reader from the sleep mode to the off mode in response to the expiration of a predetermined time period with no activity occurring at the payment reader. The power management system can use reference counters to determine when to transition the payment reader from the full power mode to the low power mode and when to transition the payment reader from the low power mode to the sleep mode.

A low power mode reference counter can be used to determine when to transition the payment reader from the full power mode to the low power mode. A sleep mode reference counter can be used to determine when to transition the payment reader from the low power mode to the sleep mode. The low power mode reference counter and the sleep mode reference counter can be incremented in response to subsystems requesting use or access of the payment reader system or the payment processing subsystem and decremented in response to subsystems releasing use or access of the payment reader system or the payment processing subsystem. When the low power mode reference counter is incremented from 0 to 1, the power management system transitions the payment reader from the low power mode to the full power mode and when the low power mode reference counter is decremented from 1 to 0, the power management system transitions the payment reader from the full power mode to the low power mode. Similarly, when the sleep mode reference counter is incremented from 0 to 1, the power management system transitions the payment reader from the sleep mode to the low power mode and when the sleep mode reference counter is decremented from 1 to 0, the power management system transitions the payment reader from the low power mode to the sleep mode. In one embodiment, the power management system can also wait for the expiration of a predetermined time delay after the sleep mode reference counter reaches 0 before transitioning the payment reader from the low power mode to the sleep mode.

In addition to controlling the power of the payment reader, the power management system can also be used to transition the payment reader from the sleep mode to the low power mode in response to a preemptive wakeup signal from a Bluetooth interface. The Bluetooth interface can send the preemptive wakeup signal to a GPIO interface of the payment reader system when the Bluetooth interface wants to send a message to the UART peripheral of the payment reader system. When the Bluetooth interface is ready to transmit a message to the payment reader system, the Bluetooth interface first transmits the wakeup signal to the payment reader system and then transmits the message to the payment reader system after the expiration of a predetermined wakeup delay time.

Figure 1:
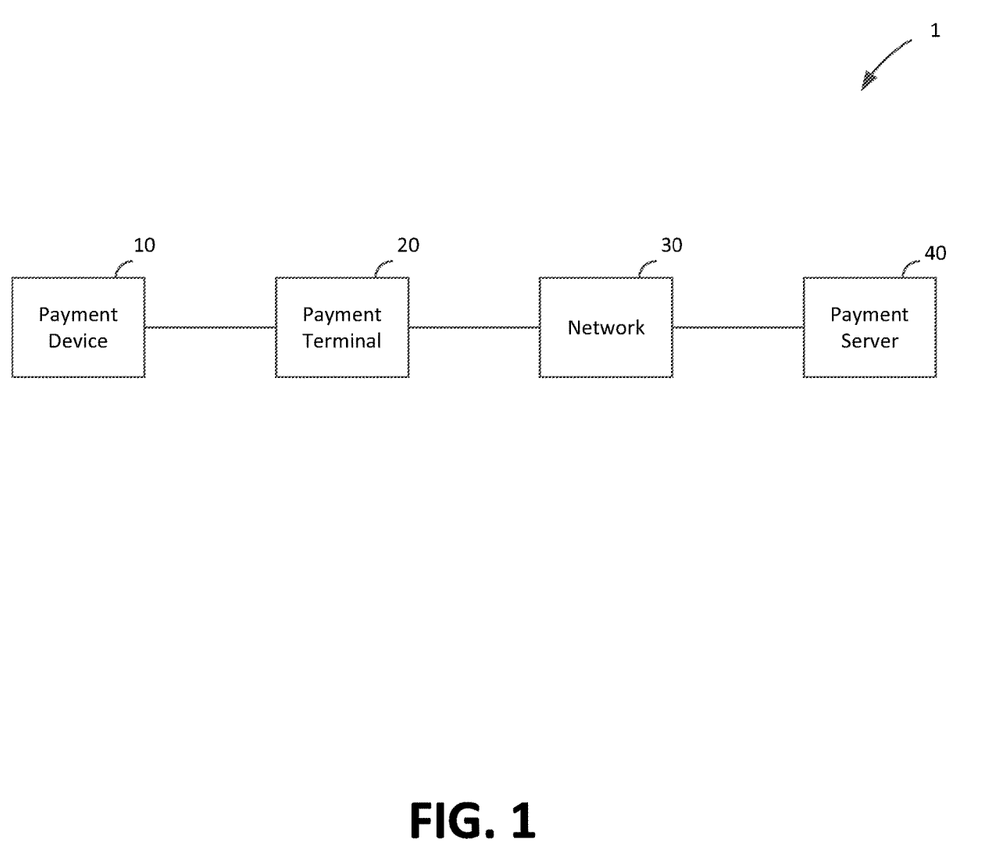
FIG. 1 shows an illustrative block diagram of a payment system in accordance with some embodiments of the present disclosure.

FIG. 1 depicts an illustrative block diagram of a payment system 1 in accordance with some embodiments of the present disclosure. In one embodiment, payment system 1 includes a payment device 10, payment terminal 20, network 30, and payment server 40. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an Europay/Mastercard/Visa ("EMV") chip, or a near field communication ("NFC") enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 is depicted as a single simplified block, it will be understood that payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment reader, for example, at a screen of a payment terminal. In other embodiments such as a smart phone or watch operating as an NFC payment device, information about the approved transaction and additional information (e.g., receipts, special offers, coupons, or loyalty program information) may be provided to the NFC payment device for display at a screen of the smart phone or watch or storage in memory.

Figure 2:
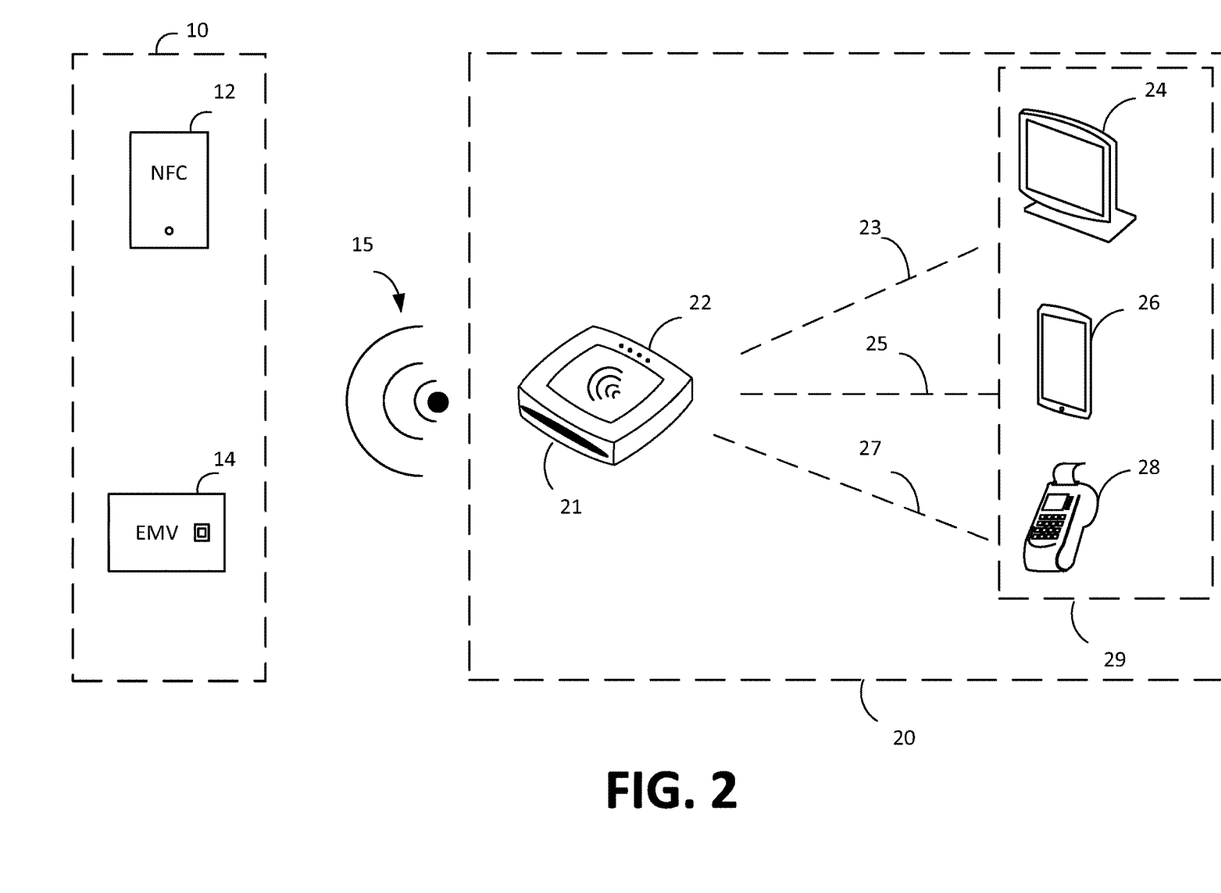
FIG. 2 depicts an illustrative block diagram of a payment device and payment reader in accordance with some embodiments of the present disclosure.

FIG. 2 depicts an illustrative block diagram of payment device 10 and payment reader 20 in accordance with some embodiments of the present disclosure. Although it will be understood that payment device 10 and payment reader 20 of payment system 1 may be implemented in any suitable manner, in one embodiment the payment terminal 20 may comprise a payment reader 22 and merchant device 29. The reader 22 of payment terminal 20 may facilitate transactions between the payment device 10 and a merchant device 29 running a point-of-sale application.

In one embodiment, payment device 10 may be a device that is capable of communicating with payment terminal 20 (e.g., via payment reader 22), such as an NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on processor in accordance with a host card emulation routine) for performing secure transaction functions. During a payment transaction, NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15 it is inductively coupled to the payment reader 22. Thus, the payment device 10 is also capable of modulating the wireless carrier signal via active or passive load modulation. By changing the tuning characteristics of the antenna of payment device 10 (e.g., by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or dedicated payment terminal 28. In the case of a computing device such as tablet payment device 24 or mobile payment device 26, a point-of-sale application may provide for the entry of purchase and payment information, interaction with a customer, and communications with a payment server. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, universal serial bus (USB), FireWire, lightning) or wireless (e.g., Wi-Fi, Bluetooth, NFC, or ZigBee) connection, in one embodiment payment reader 22 may communicate with the merchant device 29 via a Bluetooth or Bluetooth low energy interface. As described herein, in some embodiments processing of the payment transaction may occur locally on payment reader 22 and merchant device 29, for example, when a transaction amount is small or there is no connectivity to the payment server. In other embodiments, merchant device 29 or payment reader 22 may communicate with payment server 40 via a public or dedicated communication network 30. Although communication network 30 may be any suitable communication network, in one embodiment communication network 30 may be the Internet and payment and transaction information may be communicated between payment terminal 20 and payment server 40 in an encrypted format.

Figure 3:
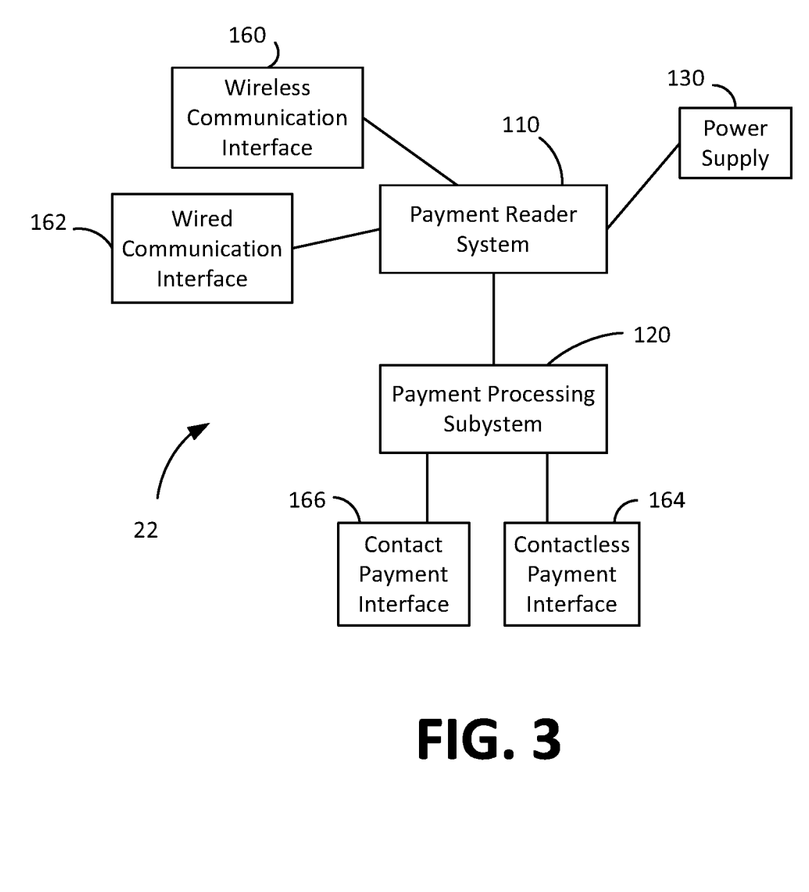
FIG. 3 depicts an illustrative block diagram of a payment reader in accordance with some embodiments of the present disclosure.

FIG. 3 depicts a block diagram of payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a payment reader system 110, payment processing subsystem 120, a battery or power supply 130, a wireless communication interface 160, a wired communication interface 162, a contactless payment interface 164, e.g., an NFC communication interface, and a contact payment interface 166, e.g., an EMV chip interface. In one embodiment, the payment reader system 110 is used to control the operation of the payment reader 22 and the payment processing subsystem 120 is used to exchange data with payment devices 10, process payment information, and perform cryptographic operations. The payment processing subsystem 120 can exchange data with payment devices 10 through either the contact payment interface 166 or the contactless payment interface 164 and can be coupled to the payment reader system 110 to exchange data with the payment reader system 110. Although the contact payment interface 166 and the contactless payment interface 164 are examples of types of payment interfaces that may be included within payment reader 22, it will be understood that any suitable payment interface (e.g., a magnetic card reader) may be included within payment reader 22 in accordance with the embodiments of the present disclosure.

The payment reader 22 may include any suitable hardware, software, memory, and circuitry as is necessary to perform and control the functions of the payment reader 22. In one embodiment, the payment reader 22 includes a plurality of processors that execute instructions stored in associated memories of components of payment reader 22, to control the operations and processing of payment reader 22. As used herein, a processor may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

In one embodiment, payment reader system 110 may include two processing cores running instructions stored on associated memory (e.g., flash memory) of payment reader system 110, while payment processing subsystem 120 may include two RISC processors. One RISC processor can be configured to perform general payment processing and interactions with payment devices, based on executable instructions stored in memory associated with the payment processing subsystem 120. The other RISC processor can be configured to perform cryptographic processing functions as part of the payment processing subsystem 120 based on executable instructions stored in memory associated with the payment processing subsystem 120. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Wireless communication interface 160 includes hardware and software for communicating with external electronic devices wirelessly, such as Wi-Fi, Bluetooth, or Bluetooth low energy. In some embodiments, wireless communication 160 interface may include its own processor and memory, for sending, receiving, and processing wireless communications. Wired communication interface 162 includes hardware, software, and a physical interface to facilitate wired communications with an external electronic device via an interface such as USB, Ethernet, FireWire, or lightning. Using the wireless communication interface 160 and wired communication interface 162, payment reader 22 may communicate with external electronic devices such as a merchant device 29. In some embodiments, payment reader 22 may communicate with other electronic devices such as a remote server, (e.g., to provide payment or transaction information directly to the server, receive updates from a server, or communicate certification or approval data with the server), or with another electronic device.

Contactless payment interface 164 may be a suitable interface for NFC communication with an NFC payment device 12. Contactless payment interface 164 may include circuitry for generating and modulating a carrier signal to communicate with the NFC device 12. Contact payment interface 166 may be a suitable interface for providing power to a payment chip such as an EMV chip of a chip card 14 and communicating with the EMV chip. Contact payment interface 166 may include a plurality of contact pins for physically interfacing with the chip card 14 according to EMV specifications.

Power supply 130 may include one or more power supplies such as a physical connection to AC power or a battery. Power supply 130 may include power conversion circuitry for converting AC power and/or generating a plurality of DC voltages for use by components of payment reader 22. When power supply 130 includes a battery, the battery may be charged via a physical power connection, via inductive charging, or via any other suitable method.

The payment reader 22 may also include other circuitry such as additional interface circuitry, analog front end circuitry, and security circuitry. In one embodiment, the additional interface circuitry may include circuitry for interfacing with other communication interfaces or buses (e.g., $I^2C$, SPI, UART, and GPIO). In one embodiment, analog front end circuitry of payment reader 22 includes circuitry for interfacing with the analog components of payment reader 22 (e.g., electromagnetic compatibility (EMC) circuitry, matching circuits, and modulation circuitry). Security circuitry of payment reader 22 may include the circuitry for protecting sensitive information such as encryption keys, merchant information, and customer information. In one embodiment, security circuitry may include tamper protection circuitry and electronic fuses for selectively cutting off power or disabling one or more components of payment reader 22 in response to attempts to obtain improper access to payment reader 22.

Figure 4:
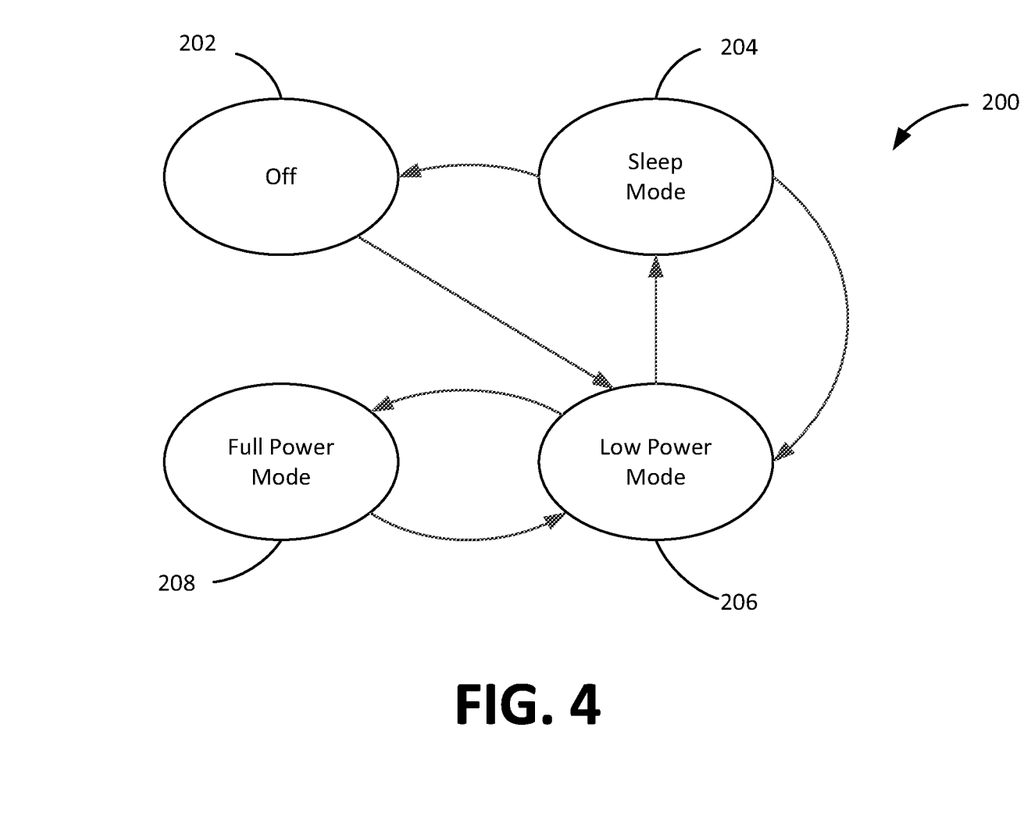
FIG. 4 depicts a state diagram of a power management system in accordance with some embodiments of the present disclosure.

FIG. 4 depicts a state diagram of a power management system 200 for a payment reader 22. The power management system 200 can include 4 states or modes that are associated with different levels of power usage by the payment reader 22. However, in other embodiments additional or fewer modes may be incorporated into power management system 200. The power management system 200 shown in FIG. 4 has an "off" mode or state 202, a "sleep" mode or state 204, a "low power" mode or state 206 and a "high power" mode or state 208. For example, the payment reader 22 can use 0 mA (milliamperes) in the off mode 202, about 2-3 mA in the sleep mode 204, about 25 mA in the low power mode 206 and about 100 mA in the high power mode 208. Thus, the power management system 200 can be used to conserve power in the payment reader 22 by transitioning the payment reader 22 from higher-usage power modes to lower-usage power modes. By operating the payment reader 22 in the lower-usage power modes, the power management system 200 can extend the life of power supply 130 and thereby extend the operational time of the payment reader 22.

In the off mode 202, the power management system 200 prevents the payment reader 22 from using power and the systems, components, modules, or software of the payment reader 22 are not operational. A user activation of the payment reader 22, such as by the selection of a button on the payment reader 22 or the insertion of a USB cable into the wired communication interface 160, may cause the power management system 200 to switch the mode of the payment reader 22 from the off mode 202 to another mode, such as the low power mode 206. In some embodiments (not depicted in FIG. 4), different stimuli may result in switching to different modes from the off mode 202. For example, an extended button push may cause the payment reader to enter the full power mode 208, while insertion of a payment card or wired communication interface may cause initiation of the low power mode 206.

In the low power mode 206, only a subset of the physical components of the payment reader 22 are operational. In one embodiment, the payment reader system 110 (and its corresponding subsystems) may be powered and operational, but the payment processing subsystem 120 may be neither powered nor operational. In some embodiments, limiting the time during which the payment processing subsystem 120 is operating may result in significant power savings. The payment reader 22 can remain in the low power mode 206 until the power management system 200 switches the mode of the payment reader 22 to either the full power mode 208 or the sleep mode 204. The power management system 200 can switch the payment reader 22 from the low power mode 206 to the full power mode 208 in response to any suitable request that requires components that are not operational during the low power mode 206 to be operational. In an embodiment where the payment processing subsystem 120 is not operational during the low power mode 206, a request that requires the payment processing subsystem 120 to be operational (e.g., a request to process a payment or a firmware update for the payment processing subsystem 120) may cause the full power mode 208 to be entered. When the components (e.g., payment processing system 120 is finished processing the payment transaction, or the firmware update is complete) are no longer required to be operational, the power management system 200 may transition the payment reader 22 from the full power mode 208 back to the low power mode 206.

The power management system 200 can transition the payment reader 22 from the low power mode 206 to the sleep mode 204 to reduce power consumption by additional subsystems, for example, the payment reader system 110. The power management system 200 can transition the payment reader 22 back to the low power mode 206 from the sleep mode 204 in response to the occurrence of several different events, such as the initiation of a payment transaction, e.g., the insertion of a chip card into EMV slot 21, the receipt of a message via wired communication interface 162 or wireless communication interface 160, e.g., a message from merchant device 29, or the user selection of a button on the payment reader 22. As previously discussed, the power management system 200 can then transition the payment reader 22 from the low power mode 206 to either the full power mode 208 or the sleep mode 204 as appropriate. When in the sleep mode 204, the power management system 200 can transition the payment reader 22 to either the low power mode 206, as previously discussed, or the off mode 202. The power management system 200 can transition the payment reader 22 from the sleep mode 204 to the off mode 202 in response to any suitable indicator that power is no longer required by any components, such as in response to the expiration of a predetermined time period of inactivity at the payment reader 22 or a low battery charge. In one embodiment, the predetermined time period can be about 2 hours. However, in other embodiments, the predetermined time period can be shorter or longer than 2 hours, or may additionally be based on user settings, user transaction history, or available battery power. In still other embodiments, the period of inactivity can be indicated by not receiving messages from the merchant device 29 even if the payment reader 22 is connected to the merchant device 29.

In some embodiments, transitions between the sleep and low power modes, and between the low power and full power modes, may be based on one or more counters. Although the discussion herein may focus on a plurality of counters (i.e., one for each mode transition), in some embodiments, a single counter may be used for a plurality or all mode transitions, with values (e.g., a plurality of thresholds) resulting in different transitions between modes. In some embodiments, a degree of hysteresis may be provided with the counter (e.g. with differing thresholds) to prevent frequent changes between power modes.

In some embodiments, the power management system 200 may use a sleep mode reference counter in determining when to transition the payment reader 22 between the low power mode and the sleep mode and a low power mode reference counter in determining when to transition the payment reader 22 between the full power mode and the low power mode. In one embodiment, the power management system 200 can transition the payment reader 22 from the low power mode 206 to the full power mode 208 upon a subsystem of the payment reader system 110 requiring use or access to the components that are not operational in the low power mode (e.g., payment processing subsystem 120). When the subsystem requests use or access of the payment processing subsystem 120, the subsystem may cause the power management subsystem 200 to increment the low power mode reference counter (e.g., from 0 to 1). As additional subsystems require use or access of the payment processing subsystem 120, the additional subsystems can further increment the low power mode reference counter above 1. When any subsystem has completed its use or access of the payment processing subsystem 120, the subsystem can decrement the low power mode reference counter by 1. In some embodiments, each subsystem may have exclusive access to the payment processing subsystem 120 (e.g., based on the order in which the low power mode reference counter was incremented or a priority assigned to each subsystem). When a subsystem is done, it may decrement the low power mode reference counter. If other subsystems have requested use or access of the payment processing subsystem 120, the other subsystems can then use or access the payment processing subsystem 120 and then decrement the low power mode reference counter. Once the low power mode reference counter reaches a predetermined value (e.g., 0), the power management system 200 can transition the payment reader 22 from the full power state 208 to the low power state 206.

The power management system 200 can transition the payment reader 22 from the sleep mode 204 to the low power mode 206 upon a subsystem of the payment reader system 110 requiring use or access to one or more subsystems of the payment reader system 110 or other components of the payment reader 22 that are not operational in the sleep mode 204. When the subsystem requests use or access of another subsystem or other component, the subsystem can increment the sleep mode reference counter (e.g., from 0 to 1). As additional subsystems require use or access of further subsystems or components, the additional subsystems can further increment the sleep mode reference counter above 1. When any subsystem has completed its use or access of the payment reader system 110, other subsystems or other components, the subsystem can decrement the sleep mode reference counter by 1. In some embodiments, each subsystem may have exclusive access to the components that are active in the low-power mode (e.g., based on the order in which the sleep mode reference counter was incremented or a priority assigned to each subsystem). When a subsystem is done, it may decrement the sleep mode reference counter. If other subsystems have requested use or access to subsystems of the payment reader system 110 or other components of the payment reader 22, the other subsystems can then use or access the payment reader system 110 and then decrement the sleep mode reference counter. Once the sleep mode reference counter reaches a predetermined value (e.g., 0), the power management system 200 can transition the payment reader 22 from the low power state 206 to the sleep state 204.

In one embodiment, the low power mode reference counter and the sleep mode reference counter can be incremented and decremented using a "wake-lock" process. The use of the wake-lock process avoids a "race condition" between subsystems such that multiple subsystems are prevented from reading the same value of the sleep mode reference counter or the low power mode reference counter at the same time and incrementing the sleep mode reference counter or the low power mode reference counter to the same value. The wake-lock process provides a type of synchronization primitive and can operate in the atomic region to provide either a +1 or −1 of the sleep mode reference counter or the low power mode reference counter. For example, a subsystem can use a "wake, lock, acquire" process to increment the sleep mode reference counter or the low power mode reference counter and a "wake, lock, release" process to decrement the sleep mode reference counter or the low power mode reference counter.

As discussed above, the sleep mode reference counter and the low power mode reference counter can be incremented or decremented by 1. However, in other embodiments, the sleep mode reference counter and the low power mode reference counter may be incremented or decremented by more than 1. If the sleep mode reference counter or the low power mode reference counter is incremented by more than 1 by a subsystem, the same subsystem may decrement the sleep mode reference counter or the low power mode reference counter by the same amount to avoid counter errors.

Figure 5:
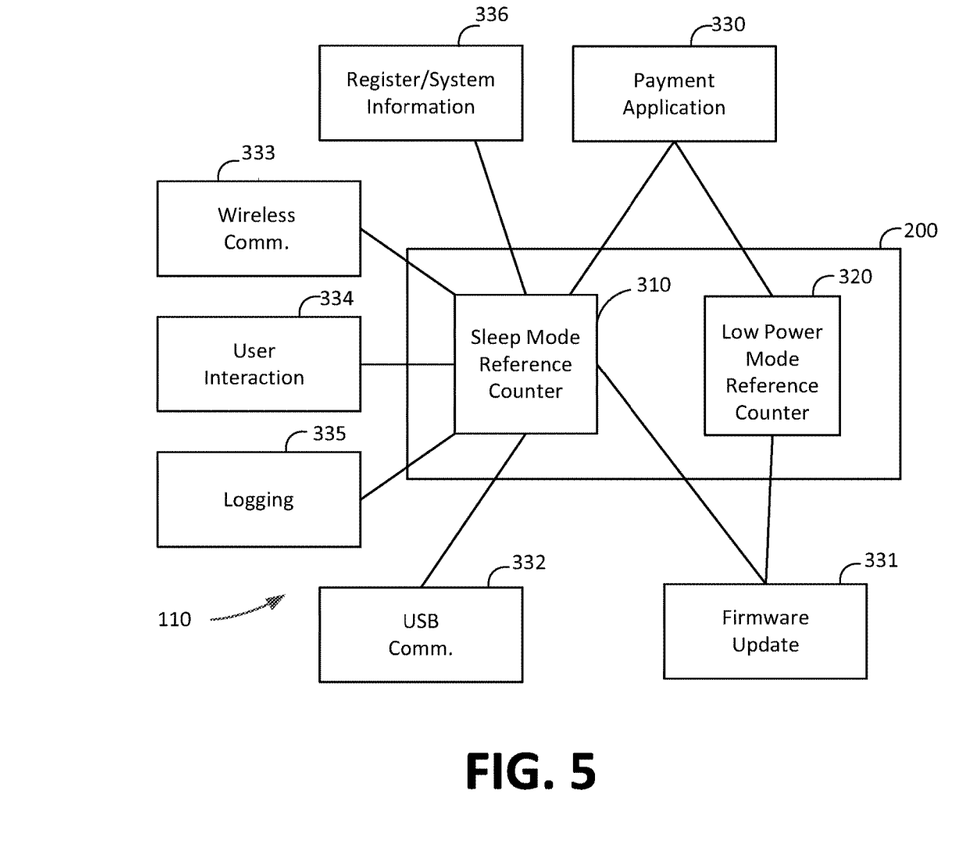
FIG. 5 depicts an illustrative block diagram of the payment reader system in accordance with some embodiments of the present disclosure.

FIG. 5 depicts an illustrative block diagram of the relationship of some of the subsystems of the payment reader 22 (e.g., subsystems of payment reader system 110). Although particular subsystems are depicted in a particular configuration in FIG. 5, it will be understood that payment reader system 110 may include additional subsystems, certain subsystems may not be included in payment reader system 110, and subsystems of payment reader system 110 may be rearranged in any suitable manner. The power management system 200 of the payment reader system 110 can be in communication with the other subsystems of the payment reader system 110. The other subsystems of the payment reader system 110 do not communicate with each other in the embodiment shown in FIG. 5, but may communicate with one another in other embodiments. The power management system 200 can include the sleep mode reference counter 310 and the low power mode reference counter 320. The sleep mode reference counter 310 and the low power mode reference counter 320 can be stored in a memory device of the payment reader system 110.

Although any suitable subsystem may modify a suitable counter, in an embodiment, the low power mode reference counter 320 can be incremented and decremented by the payment application subsystem 330 and the firmware update subsystem 331. The payment application subsystem 330 can be used for the processing of payment transactions by users and the firmware update subsystem 331 can be used to manage the firmware updates for the payment reader system 110, the payment processing subsystem 120 and the wireless communication interface 160.

In some embodiments, the payment application subsystem 330 and the firmware update subsystem 331 can also increment and decrement the sleep mode reference counter 310. The sleep mode reference counter 310 can also be incremented and decremented by a USB communication subsystem 332, a wireless communication subsystem 333, a user interaction subsystem 334, a logging subsystem 335, and a register/system information subsystem 336. The USB communication subsystem 332 can process communications received from wired communication interface 162. The wireless communication subsystem 333 can process communications from wireless communication interface 160. The user interaction subsystem 334 can process user interactions, such as button presses, with the payment reader 22. The logging subsystem 335 can log activities associated with the payment reader system 110. The register/system information subsystem 336 can process messages from the merchant device 29 and/or the payment terminal 28. In one embodiment, the subsystems 330-336 can be implemented in software and can correspond to tasks in the operating system of the payment reader 22. In other embodiments, the subsystems 330-336 can be a group of tasks or a logical grouping of functionality.

Figure 6:
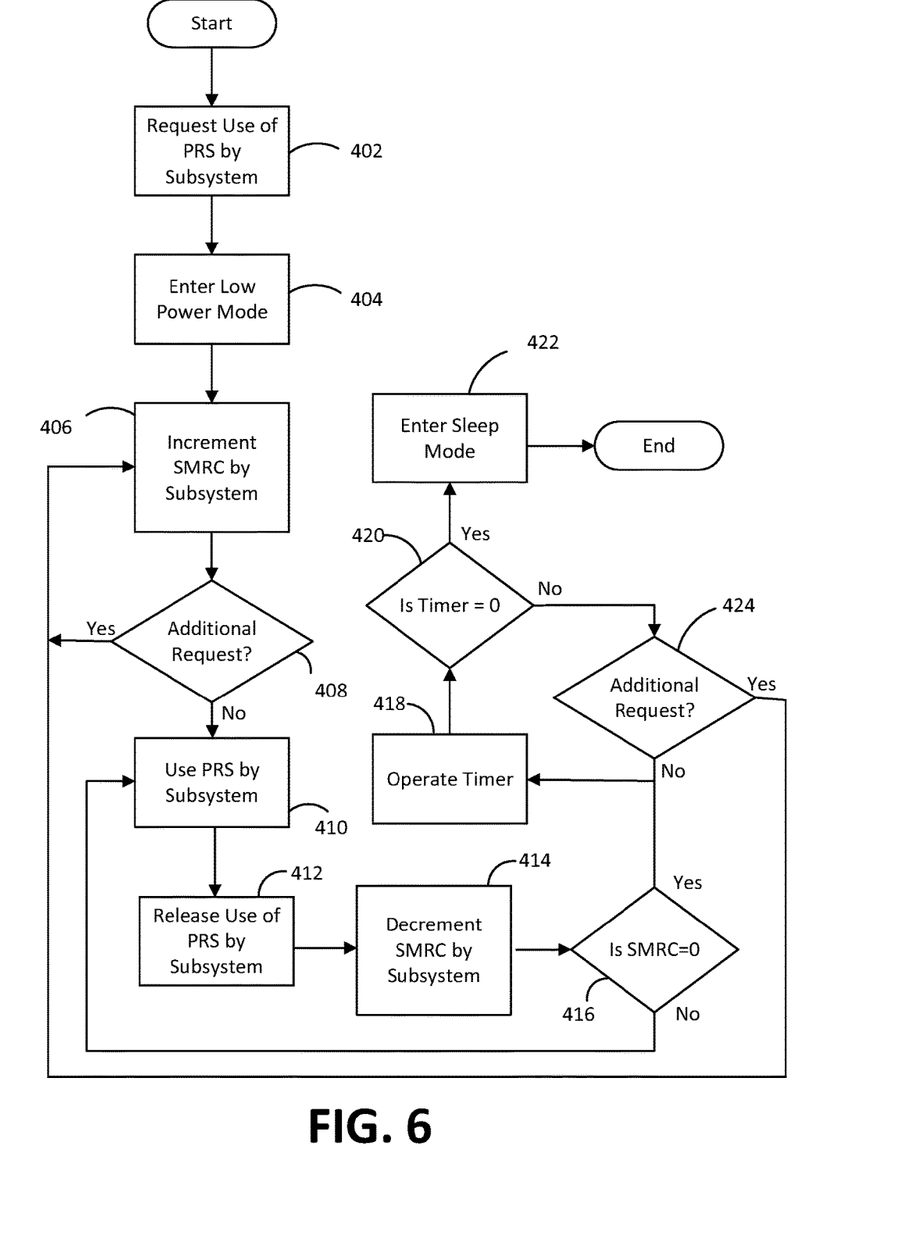
FIG. 6 depicts a non-limiting flow diagram illustrating exemplary steps for entering a sleep mode in accordance with some embodiments of the present disclosure.
Figure 7:
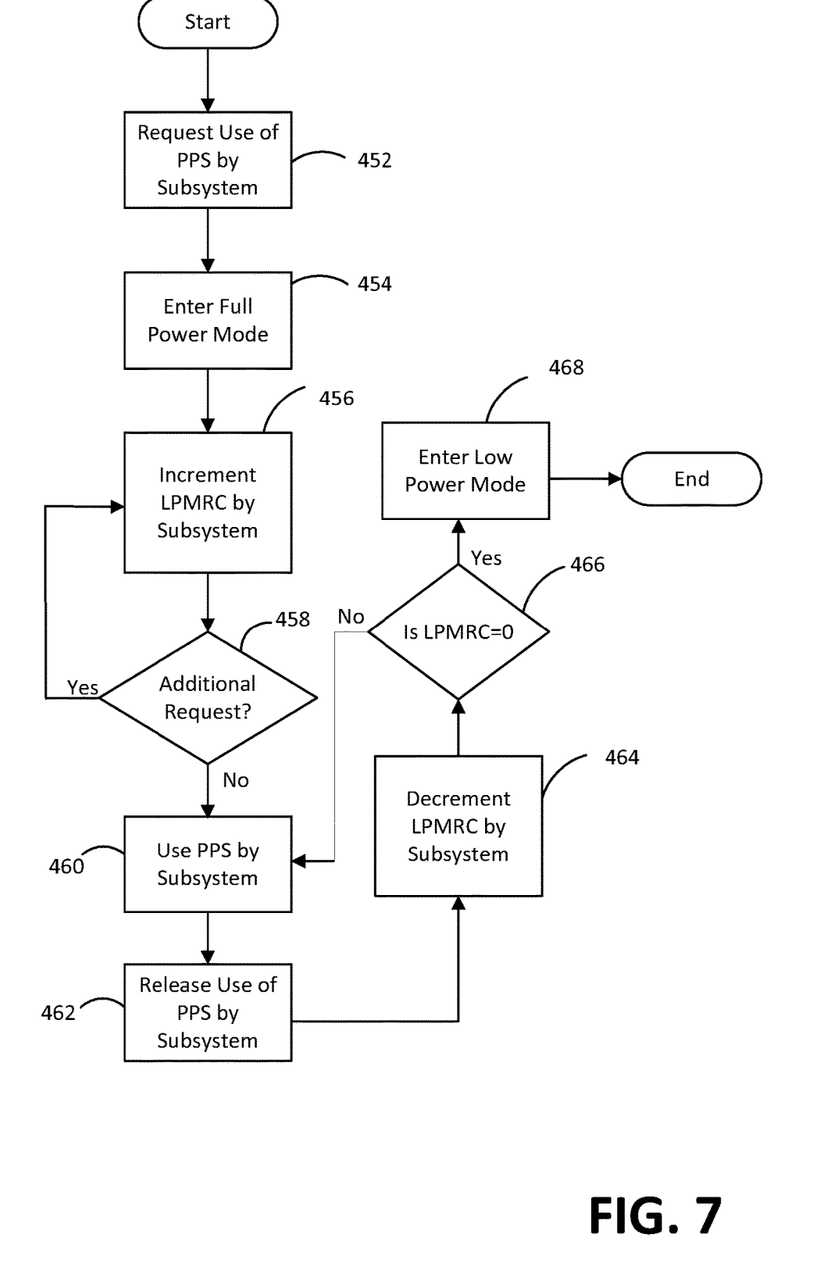
FIG. 7 depicts a non-limiting flow diagram illustrating exemplary steps for entering a low power mode in accordance with some embodiments of the present disclosure.

In view of the structures and devices described supra, methods that can be implemented in accordance with the disclosed subject matter will be better appreciated with reference to the flowcharts of FIGS. 6 and 7. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts a non-limiting flow diagram illustrating exemplary steps for entering a sleep mode 204. At step 402, a subsystem 330-336 can request usage or access to the payment reader system 110 when the payment reader 22 is operating in either off mode 202 or the sleep mode 204. As discussed above, depending on whether the payment reader is in the off mode 202 or the sleep mode 204 will determine which subsystems 330-336 can request use or access to the payment reader system 110. For example, if the payment reader 22 is in the off mode 202 only the user interaction subsystem 334 and the USB communication subsystem 332 can request use or access of the payment reader system 110 and if the payment reader 22 is in the sleep mode 204 only the payment application subsystem 330, the USB communication subsystem 332, the wireless communication subsystem 333 and the user interaction subsystem 334 can request use or access of the payment reader system 110.

At step 404, the power management system 200 transitions the payment reader 22 into the low power mode 206 by activating the payment reader system 110 and corresponding subsystems 330-336. At step 406, the requesting subsystem 330-336 can increment the sleep mode reference counter 310. In another embodiment, the power management system 200 can be responsible for incrementing the sleep mode reference counter 310. At step 408, the power management system 200 determines whether an additional request for use or access of the payment reader 22 has been made by another subsystem 330-336. Once the payment reader 22 has entered the low power mode 206, any of the subsystems 330-336 can request use or access of the payment reader system 110 or subsystems thereof. If an additional request has been made by another subsystem 330-336, the process returns to step 406 and the corresponding requesting subsystem can increment the sleep mode reference counter 310. If there is no additional request for the use or access of the payment reader system 110, the process proceeds to step 410.

At step 410, the requesting subsystem 330-336 can use or access the payment reader system 110. When the requesting subsystem 330-336 has completed its use of the payment reader system 110, the process proceeds to step 412. At step 412, the requesting subsystem 330-336 releases use of the payment reader system 110. At step 414, the requesting subsystem 330-336 can decrement the sleep mode reference counter 310. The sleep mode reference counter 310 can be checked to see if it is equal to zero at step 416. If the sleep mode reference counter 310 is greater than 0, then the process returns to step 410 and another process can use or access the payment reader system 110. If more than one subsystem 330-336 has requested use or access of the payment reader system 110, the requesting subsystems 330-336 can be queued so that the requesting subsystems 330-336 can access the payment reader system 110 in the order that they requested use or access.

If the sleep mode reference counter 310 is equal to 0, the process proceeds to step 418. At step 418, a timer is started to provide a predetermined delay period before taking another action. In one embodiment, the predetermined delay period can be 500 milliseconds (mS), but the predetermined delay period could be higher or lower than 500 mS in other embodiments. At step 420, the timer is checked to determine if the timer has reached 0. In another embodiment, the timer can be configured to count upwards to a predetermined number instead of counting down from a predetermined number to 0. If the timer has not reached 0, the process proceeds to step 424. At step 424, a determination is made as to whether a subsystem 330-336 has requested use or access to the payment reader system 110. If no subsystem 330-336 has requested access to the payment reader system 110, the process returns to step 420 to determine if the timer has reached 0. However, if a subsystem 330-336 has made a request for access to the payment reader system 110, the process returns to step 406 to increment the sleep mode reference counter 310.

Referring back to step 420, if the timer has reached 0, the process proceeds to step 422. At step 422, the power management system 200 can transition the payment reader 22 from the low power mode 206 to the sleep mode 204 and the process ends. The power management system 200 transitions the payment reader 22 into the sleep mode 204 by deactivating one or more subsystems 330-336 of the payment reader system 110. The power management system 200 enters the sleep mode 204 after the sleep mode reference counter 310 has reached 0 and the predetermined time delay has elapsed to make sure that no subsystem 330-336 requests access of the payment reader system 110 and that each subsystem 330 is idle. In another embodiment, the timer and steps 418, 420 and 424 do not have to be used and the power management system 200 can transition the payment reader 22 to the sleep mode upon the sleep mode reference counter reaching 0 in step 416.

FIG. 7 depicts a non-limiting flow diagram illustrating exemplary steps for entering a low power mode 206. At step 452, a subsystem such as either the payment application subsystem 330 or the firmware update subsystem 332 can request usage or access to the payment processing subsystem 120 when the payment reader 22 is operating in the low power mode 206.

At step 454, the power management system 200 transitions the payment reader 22 into the full power mode 208 by activating the payment processing subsystem 120. At step 456, the subsystem invoking the full power mode 208 (e.g., the payment application subsystem 330 or the firmware update subsystem 332) can increment the low power mode reference counter 320. In another embodiment, the power management system 200 can be responsible for incrementing the low power mode reference counter 320. At step 458, the power management system 200 determines whether an additional request for use or access of the payment reader 22 has been made by the payment application subsystem 330 or the firmware update subsystem 332. If an additional request has been made by either the payment application subsystem 330 or the firmware update subsystem 332, the process returns to step 456 and the corresponding requesting subsystem can increment the low power mode reference counter 320. If there is no additional request for the use or access of the payment processing subsystem 120, the process proceeds to step 460.

At step 460, the payment application subsystem 330 or the firmware update subsystem 332 can use or access the payment processing subsystem 120. When the payment application subsystem 330 or the firmware update subsystem 332 has completed its use of the payment processing subsystem 120, the process proceeds to step 462. At step 462, the payment application subsystem 330 or the firmware update subsystem 332 releases use of the payment processing subsystem 120. At step 464, the payment application subsystem 330 or the firmware update subsystem 332 can decrement the low power mode reference counter 320. The low power mode reference counter 320 can be checked to see if it is equal to 0 at step 466. If the low power mode reference counter 320 is greater than 0, then the process returns to step 460 and another process can use or access the payment processing subsystem 120. If more than one of the payment application subsystem 330 or the firmware update subsystem 332 has requested use or access of the payment processing subsystem 120, the payment application subsystem 330 or the firmware update subsystem 332 can be queued so that the requesting subsystems 330 and 331 can access the payment processing subsystem 120 in the order that they requested use or access.

Referring back to step 466, if the low power mode reference counter 320 has reached 0, the process proceeds to step 468. At step 468, the power management system 200 can transition the payment reader 22 from the full power mode 208 to the low power mode 206 and the process ends. The power management system 200 enters the low power mode 206 after the low power mode reference counter 320 has reached 0. The power management system 200 transitions the payment reader 22 into the low power mode 206 by deactivating the payment processing subsystem 120 and corresponding subsystems. In another embodiment, a timer can be used to provide a time delay between the low power mode reference counter 320 being equal to 0 and the transition from the full power mode 208 to the low power mode 206.

Figure 8:
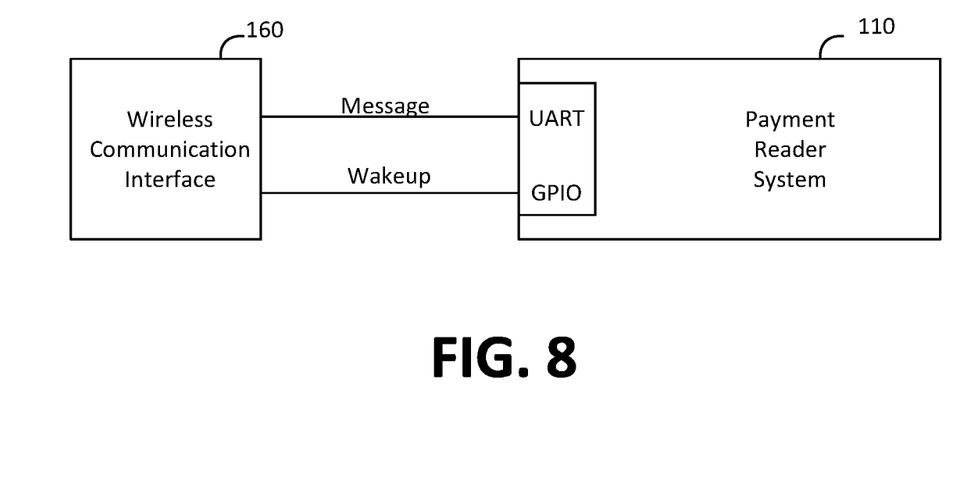
FIG. 8 depicts an illustrative block diagram of a payment reader system and wireless communication interface in accordance with some embodiments of the present disclosure.

FIG. 8 depicts an illustrative block diagram of a payment reader system 110 and wireless communication interface 160. The wireless communication interface 160 can be connected to the payment reader system 110 by two separate communication lines, e.g., a message line and a wakeup line. Although the message line and wakeup line may be connected to any suitable bus or interface, in an embodiment a message line can be connected to a UART interface or peripheral of the payment reader system 110 and the wakeup line can be connected to a GPIO interface or peripheral of the payment reader system 110. In one embodiment, the wireless communication interface 160 can be a Bluetooth low energy interface that communicates with the merchant device 29.

The wireless communication interface 160 can transmit received messages to the payment reader system 110 via the message line connected to the UART interface. However, if the payment reader 22 is in the sleep mode 204, the wireless communication interface 160 will not be able to transmit a message to the payment reader system 110 via the message line without incurring any errors, e.g., the corruption of one or more initial bytes of the message, since the UART interface may not wakeup fast enough from a sleep mode or have a large enough buffer to capture the entire message when the payment reader system 110 is simultaneously waking up in response to the message. To ensure that the payment reader system 110 and the UART interface is ready to receive a transmission via the message line; the wireless communication interface 160 can transmit a wakeup signal to the payment reader system 110 via the wakeup line connected to the GPIO interface before the transmission of the message via the message line. The GPIO interface can be a low level interface that initiates the wakeup process, i.e., the transition from the sleep mode 204 to the low power mode 206, in the payment reader system 110 upon receipt of the wakeup signal.

To enable a successful transmission each time, the wireless communication interface 160 can transmit the wakeup signal before each transmission to the payment reader system 110. However, in other embodiments, the wireless communication interface 160 can know the state of the payment reader system 110 and only transmit the wakeup signal in those situations where the wireless communication interface 160 knows that the payment reader system 110 is in a sleep mode 204. The wireless communication interface 160 can transmit the message to the payment reader system 100 after the expiration of a predetermined time delay from the transmission of the wakeup signal. In one embodiment, the predetermined time delay can be 4 mS, but can be greater than or less than 4 mS in other embodiments. In addition, in order to avoid lost or corrupted data, the message is not transmitted during the predetermined time delay.

Figure 9:
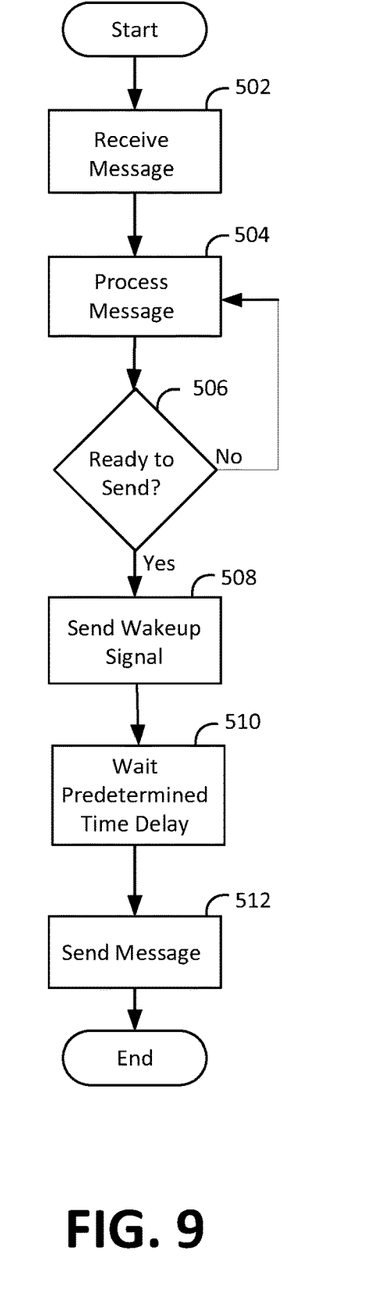
FIG. 9 depicts a non-limiting flow diagram illustrating exemplary steps for transmitting messages from a wireless communication interface to a payment reader system in accordance with some embodiments of the present disclosure.

In view of the structures and devices described supra, methods that can be implemented in accordance with the disclosed subject matter will be better appreciated with reference to the flowchart of FIG. 9. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 9 depicts a non-limiting flow diagram illustrating exemplary steps for transmitting messages from a wireless communication interface 160 to a payment reader system 110. At step 502, the wireless communication interface 160 receives a message, such as a message from the merchant device 29. At step 504, the wireless communication interface 160 begins processing the message. At step 506, a determination is made as to whether the wireless communication interface 160 is ready to send the message to the payment reader system 110. If the wireless communication interface 160 is not ready to send the message, the process returns to step 504 for further processing of the message. However, if the wireless communication interface 160 is ready to send the message to the payment reader system 110, the process proceeds to step 508

At step 508, the wireless communication interface 160 transmits the wakeup signal to the GPIO interface of the payment reader system 110. The receipt of the wakeup signal at the GPIO port can trigger the power management system 200 to transition the payment reader from the sleep mode 204 to the low power mode 206. At step 510, the wireless communication interface 160 waits for the expiration of the predetermined time delay, which delay was initiated on the sending of the wakeup signal. Once the predetermined time delay has expired, the wireless communication system 160 can transmit the message to the payment reader system 110 at step 512 and the process ends.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment reader that operates in a plurality of power modes, comprising:
    a wireless communication interface in communication with a point of sale application running on a seller mobile device;
    a contactless interface configured to communicate with a contactless payment device;
    a contact interface configured to receive a chip card and communicate with the chip card;
    a battery;
    a payment processing subsystem in communication with the contactless interface and the contact interface, and configured to process payments based on information received from the contactless interface and contact interface; and
    a payment reader system configured to operate a plurality of reader subsystems, a payment application subsystem and a power management subsystem, and to store a sleep mode reference counter and a low power mode reference counter,
    wherein each of the payment application subsystem and the plurality of reader subsystems is capable of modifying one or more of the sleep mode reference counter and the low power mode reference counter,
    wherein the power management subsystem is configured to modify the power mode of the payment reader based on the sleep mode reference counter and the low power mode reference counter, wherein in a full power mode, the contactless interface, contact interface, payment processing subsystem, and the plurality of reader subsystems are all operational, wherein in a low power mode, the contactless interface, contact interface, and payment processing subsystem are not operational, and wherein a transition between the full power mode and the low power mode is based on a value of the low power mode reference counter, and wherein in a sleep mode, the contactless interface, contact interface, payment processing subsystem, and one or more of the plurality of reader subsystems are not operational, and wherein a transition between the low power mode and the sleep mode is based on a value of the sleep mode reference counter.

2. The payment reader of claim 1, wherein the power management subsystem is configured to transition the payment reader from the full power mode to the low power mode in response to the value of the low power mode reference counter being equal to zero.

3. The payment reader of claim 1, wherein the power management subsystem is configured to transition the payment reader from the low power mode to the sleep mode in response to the value of the sleep mode reference counter being equal to zero.

4. The payment reader of claim 1, wherein the payment application subsystem is capable of incrementing the sleep mode reference counter and the low power mode reference counter in response to a user starting a payment transaction at the payment reader.

5. A payment reader comprising:
a payment reader system configured to operate a plurality of reader subsystems and a payment application subsystem, the payment reader system comprising a memory device to store a first reference counter and a second reference counter, wherein each of the payment application subsystem and the plurality of reader subsystems is capable of modifying one or more of the first reference counter and the second reference counter;
a payment processing subsystem in communication with one or more payment interfaces, the payment processing subsystem configured to process payments based on payment information received from the one or more payment interfaces, and the payment processing subsystem in communication with the payment application subsystem;
a power management subsystem configured to operate the payment reader in one power mode of a plurality of power modes, the plurality of power modes including a first power mode, a second power mode and a third power mode, and wherein, in each of the second power mode and the third power mode, power to one or more of the reader subsystems and the payment processing subsystem is reduced with respect to the first power mode; and
wherein the power management subsystem is configured to transition the power mode of the payment reader from the first power mode to the second power mode based on a value of the first reference counter and from the second power mode to the third power mode based on a value of the second reference counter.

6. The payment reader of claim 5, wherein the power management subsystem is configured to transition the payment reader from the first power mode to the second power mode in response to the value of the first reference counter being equal to zero.

7. The payment reader of claim 5, wherein the power management subsystem is configured to transition the payment reader from the second power mode to the third power mode in response to the value of the second reference counter being equal to zero.

8. The payment reader of claim 5, wherein the one or more payment interfaces comprises:
a contactless interface configured to communicate with a contactless payment device; or
a contact interface configured to receive a chip card and communicate with the chip card.

9. The payment reader of claim 5, wherein the payment application subsystem is capable of incrementing the first reference counter and the second reference counter in response to a user starting a payment transaction and capable of decrementing the first reference counter and the second reference counter in response to a user completing the payment transaction.

10. The payment reader of claim 9, wherein the power management system is configured to transition the payment reader from the second power mode to the first power mode in response to the payment application subsystem incrementing the first reference counter from zero.

11. The payment reader of claim 5, further comprising a wireless communication interface in communication with a point of sale application running on a seller device.

12. The payment reader of claim 11, wherein the wireless communication interface is configured to transmit a signal to the payment reader system in response to receiving a message at the wireless communication interface.

13. The payment reader of claim 12, wherein the power management system is configured to transition the payment reader from the third power mode to the second power mode in response to receiving the signal from the wireless communication interface.

14. The payment reader of claim 12, wherein the wireless communication interface is configured to transmit the message to the payment reader system after the transmission of the signal in response to the expiration of a predetermined time period.

15. The payment reader of claim 14, wherein the wireless communication interface transmits the signal and the message to the payment reader system using different interfaces of the payment reader system.

16. The payment reader of claim 5, wherein in the first power mode, the payment processing subsystem and the payment reader system are operational, wherein in the second power mode, the payment reader system is operational and the payment processing subsystem is not operational, and wherein in third power mode, the payment processing subsystem is not operational and one or more of the reader subsystems and the payment reader system are not operational.

17. A method for transitioning power modes in a payment reader comprising:
requesting use of at least one of a payment reader system or a payment processing subsystem by a subsystem of the payment reader system;
incrementing a first counter in response to the request;
changing a power mode of the payment reader to a first power mode from a second power mode by a power management system in response to the request, wherein the second power mode uses less power than the first power mode and the first power mode results in power being provided to at least one of the payment reader system or the payment processing subsystem;

operating the requested at least one of the payment reader system or the payment processing subsystem in the first power mode;

decrementing the first counter in response to the subsystem completing the use of the requested at least one of the payment reader system or the payment processing subsystem;

determining if the first counter is equal to zero; and modifying a power mode of the payment reader from the first power mode to the second power mode in response to the determination that the first counter is equal to zero.

18. The method of claim 17, further comprising:

starting a timer in response to the determination that the first counter is equal to zero, the timer configured to operate for a predetermined time period; and delaying the modifying of the power mode until the predetermined time period expires.

19. The method of claim 18 further comprising preventing the modifying of the power mode in response to a request for use of at least one of the payment reader system or the payment processing subsystem during the predetermined time period.

20. The method of claim 17, further comprising repeating, for a second subsystem, the requesting use of at least one of the payment reader system or the payment processing subsystem, the incrementing the first counter, the using the requested at least one of a payment reader system or a payment processing subsystem, and the decrementing the first counter.

21. The method of claim 17, wherein the first power mode is a full power mode and the second power mode results in reduced power for at least one of the payment reader system or the payment processing subsystem.

22. The method of claim 21, further comprising:

operating the payment reader in a second power mode, wherein the second power mode results in reduced power for the payment processing subsystem;

monitoring a second counter;

changing the power mode of the payment reader from the second power mode to a third power mode based on the monitored second counter, wherein the third power mode results in reduced power for both the payment reader system and the payment processing subsystem.

23. The method of claim 22, further comprising transitioning from the third power mode to an off mode in response to a predetermined period of inactivity at the payment reader.

24. The method of claim 22, further comprising:

receiving a request to use the payment reader system;

modifying the second counter based on the request; and changing the power mode of the payment reader from the third power mode to the second power mode based on the request.

25. The method of claim 24, wherein:

monitoring the second counter comprises determining whether the second counter has a value of zero;

changing the power mode of the payment reader from the second power mode to a third power mode comprises changing the power mode of the payment reader from the second power mode to the third power mode based on the second counter having the value of zero; and modifying the second counter comprises incrementing the second counter.

26. The method of claim 22, wherein the third power mode comprises a sleep mode.

27. The method of claim 17, wherein requesting use of at least one of a payment reader system or a payment processing subsystem comprises insertion of a payment card into a payment interface of the payment processing subsystem.

* * * * *